US010158116B2

(12) United States Patent
Korzhenko et al.

(10) Patent No.: US 10,158,116 B2
(45) Date of Patent: Dec. 18, 2018

(54) METHOD FOR MANUFACTURING AN ELECTRODE PASTE

(71) Applicants: ARKEMA FRANCE, Colombes (FR); VULCAN AUTOMOTIVE INDUSTRIES LTD., Yavne (IL)

(72) Inventors: Alexander Korzhenko, Pau (FR); Patrick Delprat, Lescar (FR); Christophe Vincendeau, Lons (FR); Beni Cahana, Nesher (IL)

(73) Assignee: ARKEMA FRANCE, Colombes (FR)

( * ) Notice: Subject to any disclaimer, the term of this patent is extended or adjusted under 35 U.S.C. 154(b) by 433 days.

(21) Appl. No.: 14/763,337

(22) PCT Filed: Jan. 25, 2013

(86) PCT No.: PCT/IB2013/000161
§ 371 (c)(1),
(2) Date: Jul. 24, 2015

(87) PCT Pub. No.: WO2014/114969
PCT Pub. Date: Jul. 31, 2014

(65) Prior Publication Data
US 2015/0372289 A1   Dec. 24, 2015

(51) Int. Cl.
| H01M 4/14 | (2006.01) |
| H01M 4/20 | (2006.01) |
| H01M 4/56 | (2006.01) |
| H01M 4/21 | (2006.01) |
| H01M 4/62 | (2006.01) |
| H01M 10/06 | (2006.01) |
| H01M 10/48 | (2006.01) |
| H01M 4/02 | (2006.01) |

(52) U.S. Cl.
CPC ............... *H01M 4/14* (2013.01); *H01M 4/20* (2013.01); *H01M 4/21* (2013.01); *H01M 4/56* (2013.01); *H01M 4/625* (2013.01); *H01M 10/488* (2013.01); *H01M 10/06* (2013.01); *H01M 2004/028* (2013.01); *Y10T 29/10* (2015.01); *Y10T 29/11* (2015.01)

(58) Field of Classification Search
CPC ........... H01M 4/04–4/0497; H01M 4/14–4/23; H01M 4/36–4/366; H01M 4/56–4/57; H01M 10/06–10/22; H01M 10/48; H01M 10/488
See application file for complete search history.

(56) References Cited

U.S. PATENT DOCUMENTS

| 3,881,954 A | * | 5/1975 | Maskalick | .............. H01M 4/16 205/63 |
| 5,540,915 A | * | 7/1996 | Yasuda | .................. C01G 21/10 423/619 |
| 6,489,026 B1 | | 12/2002 | Nishimura et al. | |
| 2003/0049443 A1 | | 3/2003 | Nishimura et al. | |
| 2004/0091777 A1 | * | 5/2004 | Lam | ........................ C22C 11/00 429/225 |
| 2010/0175934 A1 | | 7/2010 | Lam et al. | |
| 2011/0311876 A1 | * | 12/2011 | Sturgeon | ............... H01M 4/663 429/232 |
| 2012/0328940 A1 | | 12/2012 | Bosnyak et al. | |
| 2015/0298987 A1 | * | 10/2015 | Dhar | ................... H01M 4/5825 252/182.1 |

FOREIGN PATENT DOCUMENTS

| CN | 102496723 A | * | 6/2012 | .............. H01M 4/56 |
| EP | 1 980 530 A1 | | 10/2008 | |
| JP | S63-248056 A | | 10/1988 | |
| JP | H06-283172 A | | 10/1994 | |
| JP | 11054114 A | * | 2/1999 | .............. H01M 4/14 |
| WO | WO 2008/113133 A1 | | 9/2008 | |

OTHER PUBLICATIONS

Machine translation of JP 11054114. (Feb. 1999).*
Machine translation of CN 102496723. (Jun. 2012).*
Machine translation of JP H06-283172. (Oct. 1994).*
International Search Report (PCT/ISA/210) dated Jul. 15, 2013, by the WO Patent Office as the International Searching Authority for International Application No. PCT/IB2013/000161.
Wang et al., "Effect of MWCNTs as Additives in Lead Acid Battery", Journal of Materials Science & Engineering, (Dec. 2007), vol. 25, No. 6, (3 pages).
Endo et al., "Applications of carbon nanotubes in the twenty-first century", Phil. Trans. R. Soc. Lond. A, ( Oct. 2004), vol. 362, Issue 1823, pp. 2223-2238.
Martin-Gullon et al., "Differences between carbon nanofibers produced using Fe and Ni catalysts in a floating catalyst reactor", Carbon, (Jul. 2006), vol. 44, Issue 8, pp. 1572-1580.
Office Action (Notification of Reasons for Refusal) dated Dec. 27, 2016, by the Japanese Patent Office in corresponding Japanese Patent Application No. 2015-554255, and an English Translation of the Office Action. (9 pages).

\* cited by examiner

*Primary Examiner* — Jonathan Crepeau
*Assistant Examiner* — Jacob Buchanan
(74) *Attorney, Agent, or Firm* — Buchanan Ingersoll & Rooney P.C.

(57) ABSTRACT

A method for the manufacture of a paste composition suitable for the production of an electrode for lead-acid battery, including mixing a carbon nanofiller/lead oxide composite of a first particulate size with sulphuric acid, water and further lead oxide of a second particulate size. Also, the paste thus obtained, the composite used in its manufacture, and the electrode and lead-acid battery obtained from this paste.

12 Claims, No Drawings

METHOD FOR MANUFACTURING AN ELECTRODE PASTE

FIELD OF THE INVENTION

The present invention pertains to a method for the manufacture of a paste composition suitable for the production of an electrode for lead-acid battery, comprising mixing a carbon nanofiller/lead oxide composite with sulphuric acid, water and further lead oxide. It also pertains to the paste thus obtained, to the composite used in its manufacture and to the electrode and lead-acid battery obtained from this paste.

BACKGROUND OF THE INVENTION

From a commercial point of view, lead-acid batteries are the most important rechargeable electrochemical systems because of their high reliability and low cost compared to more recent electrochemical systems such as lithium-ion batteries. They are mainly used to start internal combustion engines, although other applications include the storage of energy produced intermittently, such as solar or wind energy.

Lead-acid batteries typically comprise an electrode assembly containing at least one negative electrode (which is the cathode, usually made of $PbO_2$, when charging the battery) and at least one positive electrode (which is the anode, usually made of spongeous lead, when charging the battery), separated by a membrane which may be made of polypropylene or glass fiber, for instance. Batteries also include a bus-bar, an electrolyte solution (generally an aqueous solution of sulphuric acid) and a housing. Each of the electrodes is carried by a current collector which is usually made of lead alloy such as a Pb/Sb or Pb/Ca alloy.

Research has been conducted in the ten last years, so as to increase the electrical conductivity of the positive electrode of lead-acid batteries, and to avoid the formation of large $PbSO_4$ crystals which prevent lead oxidation into $PbO_2$ during charging, with a view to improving the battery charge/discharge properties and thus the active mass utilization of the positive electrode. To this end, attempts have been made to incorporate carbon nanotubes in the paste used for the manufacture of this electrode. Carbon nanotubes consist of rolled graphene sheets built from $sp^2$ hybridized carbon atoms, which are known to be electrically conductive and stable in sulphuric acid electrolyte environments.

Wang et al (Effect of MWCNTs as Additives in Lead Acid Battery, *Journal of Materials Science & Engineering*, Vol. 25, no 6, 2007) have thus shown that modified multi-walled carbon nanotubes obtained by acid treatment optionally followed by graphitization, when incorporated at 0.16 wt. % in the formulation of the $PbO_2$ positive electrode, improved the conductivity of the electrode and the utilization of the active material of the battery.

Endo et al (Applications of Carbon Nanotubes in the Twenty-First century, *Phil. Trans. R. Soc. Lond. A*, Vol. 362, pp. 2223-2238, 2004) also report the addition of 1.5 wt. % of carbon nanotubes both in the positive electrode of a lead-acid battery, to improve its conductivity, and in the negative electrode, to improve the cycle characteristics when embedded in a polymer.

However, carbon nanotubes obtained by chemical vapour deposition (CVD), which is the process commonly used to produce carbon nanotubes on a large scale, have an entangled structure resulting from Van der Waals interactions between individual carbon nanotubes, which prevents their homogeneous dispersion in aqueous solvents such as those used in the manufacture of electrode pastes. This poor dispersion may in turn affect the efficacy of the charge transfer between the electrode and the electrolyte and thus the performance and lifespan of the lead-acid battery.

To overcome this deficiency, it has already been proposed to wrap the carbon nanotubes with surfactants and/or polymers which improve their compatibility with the paste medium.

It has also been suggested to prepare an electrode paste by blending lead oxide with oxidized carbon nanotubes in a planetary centrifugal mixer before adding a synthetic fiber, water and sulphuric acid thereto. This process is also too complex to be industrialized because of the large amount of lead oxide that should be ground.

Therefore, there remains the need to provide a simple and economical process for manufacturing electrode pastes containing carbon nanotubes homogeneously dispersed therein and which enable the manufacture of lead-acid batteries having good performances (high current density and possibly low formation of large crystals of $PbSO_4$) and a high lifespan (good mechanical properties and high number of charging/discharging cycles).

The inventors have now shown that this need may be satisfied by providing a process in which the electrode paste is prepared by mixing a lead oxide/nanofillers composite with the remainder of the paste formulation. Especially good results may be obtained in case this composite is obtained by ball grinding.

REFERENCES

[1] *Journal of Materials Science & Engineering*, Vol. 25, no 6, pp. 932-934, 2007
[2] *Phil. Trans. R. Soc. Lond. A*, Vol. 362, pp. 2223-2238, 2004
[3] EP 1 980 530
[4] Carbon, Vol. 44, pp. 1572-1580, 2006

SUMMARY OF THE INVENTION

In one aspect, the present invention is thus directed to a method for preparing a paste composition suitable for the production of an electrode for lead-acid battery, comprising:
(a) providing a composite material comprising carbon-based nanofillers and lead oxide of a first particulate size, and
(b) mixing said composite material with sulphuric acid, water, lead oxide of a second particulate size and, optionally, at least one reinforcing filler, such as glass fibers, to thereby obtain the paste composition.

In some embodiments, said first particulate size of the composite material is between 0.1 and 0.6 µm, preferably between 0.2 and 0.4 µm.

In other embodiments, said second particulate size is between 0.5 and 3 µm.

In another aspect, this invention is directed to the paste obtainable by this process.

In still another aspect, this invention is directed to a composite material comprising raw or oxidized carbon-based nanofillers, and lead oxide of a first particulate size, in a weight ratio of carbon-based nanofillers relative to lead oxide ranging from 5:95 to 20:80. This composite may be used in step (a) of the above process. The composite material may be obtained by ball-milling.

In a further aspect, the invention provides a paste composition comprising the composite material as described herein, sulphuric acid, water, lead oxide of a second particulate size and, optionally, at least one reinforcing filler.

In some embodiments, said second particulate size is between 0.5 and 3 µm.

In another aspect, there is provided a process for manufacturing an electrode for lead-acid battery, said process comprising the steps of:
(a) impregnating a grid with the paste composition as defined herein;
(b) pressing the impregnated grid to obtain a plate; and
(c) drying said plate to cure the paste composition.

In still another aspect, this invention pertains to an electrode for lead-acid battery, especially the positive electrode, obtainable by the process defined herein.

This invention is also directed to a lead-acid battery comprising at least one electrode as defined herein.

The method for preparing a paste composition according to this invention can be easily carried out by using raw (i.e. neat or untreated carbon nanotubes), or oxidized carbon nanotubes, which need not be functionalized by a polymer. Moreover, in case the composite used in this method is obtained by ball milling, the need to mill carbon nanotubes with the entire batch of lead oxide used to manufacture the paste is obviated. Thus, the composite may be regarded as a master-batch, comprising carbon nanotubes at a given concentration, milled, e.g., in a ball-mill, into lead oxide in order to obtain a homogenous mixture of carbon nanotubes and lead oxide of a first particulate size.

The concentration of the carbon nanotubes is then reduced by mixing the master batch, or a portion thereof, into the remainder of components of the paste composition, namely sulphuric acid, water, lead oxide of a second particulate size and, optionally, at least one reinforcing filler, such as glass fibers.

This process allows for the use of a smaller, and thus less expensive, ball mill.

DETAILED DESCRIPTION

This invention will now be described in further details. In the following description, the expression "comprised between" should be understood to designate the range of values identified, including the lower and upper bounds.

Moreover, "lead oxide", as used in this specification, refers to a mixture of lead oxides having formula $PbO_x$ with $1 \leq x \leq 2$.

As mentioned above, the process of this invention comprises a first step of providing a composite material comprising carbon-based nanofillers and lead oxide.

The carbon-based nanofillers are preferably chosen from carbon nanotubes, carbon nanofibers and mixtures thereof.

Carbon nanotubes are composed of one or more concentrically rolled graphene leaflets. Thus distinctions are made between single-wall nanotubes (or SWNT) and multi-wall nanotubes (MWNT). It is preferable according to the invention to use multi-walled CNTs which are prepared by a chemical vapour deposition (or CVD) process, by catalytic decomposition of a carbon source (preferably from renewable origin), such as described in EP 1 980 530.

The carbon nanotubes used in this invention typically have an average diameter of from 0.1 to 100 nm, preferably from 0.4 to 50 nm, more preferably from 1 to 30 nm and even more preferably from 10 to 15 nm, and advantageously a length of 0.1 to 10 µm. Their length/diameter ratio, i.e. aspect ratio, is advantageously greater than 10 and usually greater than 100. Their specific surface area is, for example, between 100 and 300 $m^2/g$, preferably between 200 and 300 $m^2/g$, and their apparent density may in particular be between 0.05 and 0.5 $g/cm^3$ and more preferably between 0.1 and 0.2 $g/cm^3$. The multi-walled carbon nanotubes may, for example, contain 5 to 15 leaflets and more preferably from 7 to 10 leaflets.

One example of crude (raw) carbon nanotubes is in particular available commercially from ARKEMA under the trade name Graphistrength® C100.

The nanotubes may be purified and/or treated (especially oxidized) before being employed in the process according to the invention.

The nanotubes may be purified by washing using a solution of sulphuric acid, or of another acid, in order to remove any residual metallic and mineral impurities from them, such as iron, originating from their production process. The weight ratio of the nanotubes to the sulphuric acid may in particular be between 1:2 and 1:3. The purifying operation may, furthermore, be carried out at a temperature of from 90 to 120° C., for example for a time of 5 to 10 hours. This operation may advantageously be followed by steps of rinsing with water and drying of the purified nanotubes. Another route to purification of the nanotubes, intended in particular for removing the iron and/or magnesium and/or alumina that they contain, involves subjecting them to a heat treatment at more than 1000° C.

The nanotubes are advantageously oxidized by contacting them with a solution of sodium hypochlorite containing from 0.5% to 15% by weight of NaOCl and preferably from 1% to 10% by weight of NaOCl, in a weight ratio, for example, of the nanotubes to the sodium hypochlorite of from 1:0.1 to 1:1. The oxidation is advantageously performed at a temperature less than 60° C., and preferably at room temperature, for a time of from a few minutes to 24 hours. This oxidizing operation may advantageously be followed by steps of filtration and/or centrifugation, washing and drying of the oxidized nanotubes.

Oxidized nanotubes may also be obtained by introducing air at elevated temperatures during the milling process or during the paste composition preparation process, as will be further discussed below.

It is preferred, however, for the nanotubes to be used in the process according to the invention in the crude state.

Carbon nanofibres are, like carbon nanotubes, nanofilaments produced by chemical vapour deposition (or CVD) from a carbon source which is decomposed on a catalyst comprising a transition metal (Fe, Ni, Co, Cu), in the presence of hydrogen, at temperatures of from 500 to 1200° C. However, these two nanofillers differ from each other by their structure (I. MARTIN-GULLON et al., Carbon 44 (2006) 1572-1580). Specifically, carbon nanotubes are made of one or several graphene sheets concentrically rolled around the longitudinal axis of the fibre so as to form a cylinder having a diameter of 10 to 100 nm. In comparison, carbon nanofibres consist in more or less organized graphitic areas (also called turbostratic stacking), the planes of which are inclined at variable angles relative to the fibre's longitudinal axis. These stackings may take the form of platelets, of fishbones, or of cups which are stacked to form structures having a diameter generally comprised between 100 nm and 500 nm or even more.

The composite material of this invention may advantageously be obtained by:
grinding (i.e., milling), preferably in a ball mill, raw or oxidized carbon-based nanofillers, with lead oxide, in a weight ratio of carbon-based nanofillers relative to lead oxide ranging from 5:95 to 20:80, and
optionally shaping the resulting ground (milled) particles, to thereby obtain said composite material comprising carbon-based nanofillers and lead oxide of a first particulate size.

This grinding step may be performed in any ball mill, such as a planetary centrifugal mixer, at a speed of for instance below 150 rpm, preferably from 60 to 120 rpm, or even below 60 rpm, and for a period of time from 4 hours to 16 hours, preferably from 6 to 8 hours. Moreover, grinding is preferably performed in the absence of a polymer. The grinding means may include from 100 to 150 balls, such as ceramic balls, having for instance a diameter from 1 cm to 5 cm. As a result of this grinding step, the median diameter (D50) of carbon nanotubes is usually less than 100 µm, starting from carbon nanotubes which D50 is of about 400 µm, as measured by laser diffraction using a Malvern particle size analyzer.

According to an embodiment of this invention, this method may further comprise a preliminary step of preparing lead oxide prior to the manufacture of the composite material, by contacting, at high temperature, lead with air, to obtain a powder of lead oxide.

Alternatively, and according to a preferred embodiment, the method of this invention further comprises a step of preparing lead oxide during the manufacture of the composite material, by contacting, at high temperature, lead with air, in the ball mill used for the preparation of the composite material. In this embodiment, lead is generally introduced in the solid form, in the presence of air, in the ball mill heated at a temperature ranging from 300° C. to 400° C., preferably from 330° C. to 370° C. Typical ball mills that may be used in this embodiment are cylindrical ball mills and conical ball mills. The resulting lead oxide particles have a first particulate size in the range of from 0.1 to 0.6 µm, preferably from 0.2 to 0.4 µm, as measured by scanning-electron microscopy (SEM) particle size analysis. Part of the lead introduced into the ball mill may remain un-oxidized after grinding. This un-oxidized lead may be present, for instance, in a weight ratio of free lead to lead oxide ranging from 1:4 to 1:3. The mixture of oxidized and un-oxidized lead will be designated hereafter as "lead oxide".

In the second step of the method according to this invention, said composite material is mixed with sulphuric acid, water, and lead oxide of a second particulate size, and optionally with at least one reinforcing filler. This second particulate size is typically in the range of from 0.5 to 3 µm, as measured by SEM particle size analysis. The weight ratio of lead oxide of first particulate size (contained in the composite) to lead oxide of second particulate size to which the composite is added may represent from 0.5:10 to 1.5:10 for instance about 1:10.

The final amount of carbon-based nanofillers in the paste composition may range from 0.2 to 2 wt. %, for instance from 0.5 to 1.5 wt. % and preferably from 0.8 to 1.2 wt. %. Moreover, the lead oxide of first particulate size and lead oxide of second particulate size may together represent from 75% to 85% by weight, relative to the weight of the paste composition. The sulphuric acid may be in a concentration of from 1 to 20 mol/l and preferably from 3 to 5 mol/l. It may represent from 1 to 10 wt. % and preferably from 2 to 7 wt. % of the total weight of the paste composition. Moreover, the total amount of water in the paste composition, including that provided by diluted sulphuric acid, generally ranges from 7 wt. % to 20 wt. %, such as 10 to 15 wt. %.

The paste formulation may also include reinforcing agents such as polyester (for example polyethylene terephthalate, PET), polyacrylonitrile, glass or carbon fibres. They may have a thickness of 1 to 30 µm and a length of 0.05 to 4.0 mm. These fibres, preferably glass fibres, may represent from 0.1 to 1 wt. % and preferably from 0.1 to 1 wt. % of the total weight of the paste composition, with the proviso that the total content of the constituents of the paste amounts to 100%.

The invention also pertains to a process for manufacturing an electrode for lead-acid battery based on the above-described paste composition. Said process comprises the steps of:
(a) impregnating a grid with the paste composition;
(b) pressing the impregnated grid to obtain a plate; and
(c) drying said plate to cure the paste composition.

The grid may be flexible or rigid. It may be flat or two-dimensional or alternatively curved and thus three-dimensional. It is generally made of lead or an alloy thereof. After applying the electrode paste onto the grid, curing is generally performed at, for instance, from 30 to 65° C. under at least 80%, and preferably from 90 to 95% relative humidity, for more than 18 hours, such as 24 hours. Maturing is then preferably performed, for instance at from 55 to 80° C. under ambient relative humidity, for one to three days.

The electrode may be the positive electrode of a lead-acid battery. In this case, the negative electrode may comprise any electroactive material chosen from the group consisting of cadmium, metal hydrides, lead and zinc and preferably spongy lead.

This lead-acid battery generally includes a separator between each pair of positive and negative electrodes. This separator may be any porous non-conductive material, such as a sheet of polypropylene or polyethylene. Its thickness may range from 0.01 to 0.1 mm. One pair of electrodes together with a separator define a cell. The lead battery of this invention may include from 1 to 12 cells, which may provide each for a voltage of 1.5 to 2.5 volts. It also includes a first conductor for directly connecting the positive electrodes and a second conductor for directly connecting the negative electrodes.

The lead-acid battery obtained according to the process of this invention is operational for at least 170 cycles of operation, preferably at least 180 cycles of operation, and more preferably at least 200 cycles of operation, between charging at 14V and discharging at 10.5 V, with 25±0.3% Depth of Discharge (DOD) of the initial capacity of the battery.

This invention will be further understood in light of the following non-limiting examples which are given for illustration purposes only.

EXAMPLES

Example 1

Preparation of a Paste According to the Invention 6 kg of ceramic balls were introduced into a 10 l jar, to which 505 g of carbon nanotubes (Graphistrength® C100 from ARKEMA) and 4545 g of lead oxide were added. The jar was then placed in a ball mill which was rotated at 60 rpm for 8 hours. 5001.5 g of a black powder was recovered. This product contained 10% of carbon nanotubes and 90% of lead oxide. From the SEM analysis it arises that the ground LO has an average diameter of 0.2-0.4 µm.

1.6 g of this product was introduced into a beaker with 1.84 g of water and 14.4 g of lead oxide. A pasty mixture was obtained, to which 2.66 g of 43% $H_2SO_4$ were added dropwise. A paste containing carbon nanotubes and lead oxide in a weight ratio of 1:10 was thus obtained.

Example 2:

Preparation of a Comparative Paste 12 g of the co-milled product obtained as described in example 1 were introduced into a beaker with 1.38 g of water, so as to obtain a pasty mixture, to which 2 g of 43% $H_2SO_4$ were added dropwise. A paste containing carbon nanotubes and lead oxide in a weight ratio of 1:10 was thus obtained.

Example 3

Battery Performances

The influence of the paste of Examples 1 and 2 on the performance of lead-acid cells was investigated using 2V polypropylene cells containing approximately 200 g negative and 100 g positive electrodes, a glass separator, and a $H_2SO_4$ electrolyte solution (SG=1.205).

The positive electrodes were made from the paste of Example 1 or 2:

500 grams of the lead oxide powder from examples 1 and 2 was mixed with 0.5 grams of glass fiber for 3 minutes, then 45 ml water was added during the mixing for another 7 minutes, followed by adition of 49 ml of sulphuric acid 1.325 S.g, the acid was added graduly during another 15 minutes. The paste was then pasted onto lead antimony (1.5) grids (1.3 mm thick). These plates were then cured for at least 24 hours at 40 c at 90% RH followed by drying at 8% RH 60 C.

Standard negative electrodes were used in the above cells.

All electrochemical procedures were conducted on a DTI channel potentiat and included complete discharge at a rate C/20 to determine the effective capacity.

The paste compositions of Examples 1 and 2 allowed performing the same number of cycles, i.e. 234. This experiment shows that the paste prepared according to this invention had the same performances than the comparative paste, although its preparation process is less expensive.

The invention claimed is:

1. Method for preparing a paste composition suitable for the production of an electrode of an electrode for lead-acid battery, comprising:
   (a) providing a composite material comprising carbon-based nanofillers and lead oxide of a first particulate size, and
   (b) mixing said composite material with sulphuric acid, water, lead oxide of a second particulate size and, optionally, at least one reinforcing filler, to thereby obtain the paste composition,
   wherein the first particulate size is a different average size than the second particulate size,
   wherein the composite material is obtained by grinding the carbon-based nanofillers and lead oxide to a first particulate size.

2. (Currently Amended Method according to claim 1, wherein the composite material is obtained by:
   grinding raw or oxidized carbon-based nanofillers, with lead oxide, in a weight ratio of carbon-based nanofillers relative to lead oxide ranging from 5:95 to 20:80, and
   optionally shaping the resulting ground particles, to thereby obtain said composite material comprising carbon-based nanofillers and lead oxide of a first particulate size.

3. Method according to claim 1, wherein said first particulate size is between 0.1 and 0.6 µm.

4. Method according to claim 1, further comprising a preliminary step of preparing lead oxide prior to the manufacture of the composite material, by contacting, at high temperature, lead with air, to obtain a powder of lead oxide.

5. Method according to claim 1, further comprising a step of preparing lead oxide during the manufacture of the composite material, by contacting, at high temperature, lead with air, in a ball mill used for the preparation of the composite material.

6. Method according to claim 5, wherein lead is introduced in a solid form, in the presence of air, into the ball mill heated at a temperature ranging from 300° C. to 400° C.

7. Method according to claim 1, wherein the carbon-based nanofillers are carbon nanotubes or carbon nanofibers.

8. Method according to claim 1, wherein said second particulate size is between 0.5 and 3 µm.

9. Method according to claim 1, wherein said first particulate size is between 0.1 and 0.6 µ.m, and wherein said second particulate size is between 0.5 and 3 µm.

10. Method according to claim 1, wherein said first particulate size is between 0.1 and 0.4 µ.m, and wherein said second particulate size is between 0.5 and 3 µm.

11. Method according to claim 1, wherein said first particulate size is between 0.2 and 0.4 µ.m, and wherein said second particulate size is between 0.5 and 3 µm.

12. Method according to claim 1, wherein the carbon-based nanofillers are carbon nanotubes.

* * * * *